US005213884A

United States Patent [19]

Fellows

[11] Patent Number: 5,213,884

[45] Date of Patent: May 25, 1993

[54] DISINFECTING OR BLEACHING TISSUE

[75] Inventor: Adrian N. Fellows, Hebden Bridge, United Kingdom

[73] Assignee: PAL International Limited, Leicester, United Kingdom

[21] Appl. No.: 659,341

[22] PCT Filed: Aug. 14, 1989

[86] PCT No.: PCT/GB89/00932

§ 371 Date: Apr. 1, 1991

§ 102(e) Date: Apr. 1, 1991

[87] PCT Pub. No.: WO90/02166

PCT Pub. Date: Mar. 8, 1990

[30] Foreign Application Priority Data

Aug. 23, 1988 [GB] United Kingdom ................. 8819969

[51] Int. Cl.[5] ................................................ B32B 5/16

[52] U.S. Cl. ................................ 428/240; 15/104.93; 428/246; 428/283; 428/284; 428/287; 428/304.4; 428/323; 428/341; 428/537.1

[58] Field of Search ............... 428/240, 245, 283, 284, 428/289, 290, 402.24, 246, 287, 323, 341, 304.4, 913, 537; 422/28, 37; 15/104.93

[56] References Cited

U.S. PATENT DOCUMENTS 3,634,260 1/1972 Picken .................................. 252/95
4,259,383 3/1981 Eggensperger et al. ............. 428/72
4,515,703 5/1985 Hag ...................................... 252/92
4,532,063 7/1985 Gueldenzopf ......................... 252/90
4,728,498 3/1988 Theeuwes ............................ 422/29

FOREIGN PATENT DOCUMENTS 0051987 5/1982 European Pat. Off. .
0075419 3/1983 European Pat. Off. .
0145438 6/1985 European Pat. Off. .
WO89/05093 6/1989 PCT Int'l Appl. .

*Primary Examiner*—James J. Bell
*Attorney, Agent, or Firm*—Harrison & Egbert

[57] ABSTRACT

The present invention relates to a tissue suitable for use in the disinfection of hard surfaces, instruments and human or animal skin or as a sheet inclusion in a washing process for the purpose of disinfection or bleaching. The tissue comprises first and second substrate layers which are bonded together with an adhesive polymer. This polymer also retains solid particles between the layers, which particles, when dampened with a suitable liquid become active and release chlorine. Preferably, the adhesive polymer comprises either a copolyester, copolyamide or polyethylene hot melt adhesive powder or an ethylene vinyl acetate (EVA) or modified EVA hot melt adhesive powder with a particle size between 0 and 750 microns inclusive. Preferably also, the chlorine release agent comprises sodium dichloroisocyanurate dihydrate which is mixed with the adhesive polymer and applied between the substrate layers in coating weights between 2 and 35 grams per square meter inclusive to yield active solutions of between 10 and 10,000 parts per million available chlorine when the tissue is dampened with water.

10 Claims, No Drawings

DISINFECTING OR BLEACHING TISSUE

The present invention relates to a tissue suitable for use in the disinfection of hard surfaces, instruments and human or animal skin or as a sheet inclusion in a washing process for the purpose of disinfection or bleaching.

In our United Kingdom Patent Application No. 8727915 is described a disinfecting wipe or sheet inclusion in which a nonwoven lofted substrate is used to entrap solid particles of a chlorine releasing agent within the matrix of fibres forming its structure. The solid particles are activated to release chlorine when dampened with a suitable liquid to provide the desired disinfecting or bleaching effect.

The advantage of this product is that hitherto no similar product had been produced which utilised chlorine as a disinfecting agent. Chlorine is an effective, fast-acting surface disinfectant which can be used to kill a wide spectrum of micro-organism without leaving a sticky or smearing residue but previous methods of impregnating or coating substrates with chlorine releasing chemicals had not resulted in a stable or effective product with an appreciable shelf life.

The disadvantages of the product described in our aforementioned patent application is that it is comparatively expensive as a result of the substrate material employed. Other disinfecting products such as those described in U.S. Pat. Nos. 4,259,383 and 4,515,703 also suffer from the same disadvantage. In addition, these products do not make use of as effective a disinfecting agent as chlorine. U.S. Pat. No. 4,259,383, for example, gives an example of a surface test made using a tissue made according to its claims, wherein the killing time for certain micro-organisms is of the order of one hour. This is far too long for many practical applications of the tissue.

U.S. Pat. No. 4,532,063 describes a dissolvable bleach sheet composition which does include a chlorine release agent. However, this sheet again suffers from the disadvantage of being expensive to produce and also from the disadvantage that it is unsuitable for uses other than laundry use.

The object of the present invention is to overcome the aforementioned disadvantages and to produce a disinfecting and bleaching tissue which is inexpensive to produce and which has the advantage of using chlorine as the active agent.

According to the present invention there is provided a tissue for use in a disinfecting or bleaching operation comprising first and second substrate layers which are bonded together and between which are retained solid particles which, when dampened with a suitable liquid, become active and characterised in that the substrate layers are bonded together with an adhesive polymer which also retains the solid particles, and in that the solid particles comprise a chlorine release agent.

Preferably, one or both substrate layers comprise paper, for example wet strength tissue, high bulk tissue, dry-laid paper etc., or a nonwoven, for example dry laid coverstock, melt-blown, spun bonded, wet laid, hydroentangled powder bonded or other types of nonwoven, or a textile material, or a sponge material, or a plastics film depending on the use for which the tissue is designed. In some cases, it may be preferable for one or both substrate layers to be hydrophobic and impermeable or alternatively a high water absorption may be desirable.

Preferably also, the adhesive polymer comprises a copolyester, copolyamide or polyethylene hot melt adhesive powder, or an ethylene vinyl acetate (EVA) hot melt adhesive powder or a modified EVA hot melt adhesive powder. The particle size of these powders is in the range 0–750 microns inclusive and preferably between 50–300 microns. The hot melt adhesive powder is mixed with the solid particles comprising the chlorine release agent before its use in bonding the first and second substrates together. Typically the prepared powder composition will be applied to give coating weights of between 2 and 35 grams per square meter of low melting point polymer, along with levels of chlorine donor calculated to yield active solutions of between 10 and 10,000 ppm available chlorine upon wetting the tissue or wipe as appropriate to the product's particular application.

Besides the melting point, or melting temperature range, the melt viscosity and melt index values for the adhesive powder are considered.

In addition to the preferred polyester or polyamide families of adhesive powder, there are other individual polymers possessing appropriate characteristics, these are exemplified but not limited to polycaprolactone.

Typically, such bonding powders have a melting point or melting temperature range in the range of 60° C. to 180° C. inclusive and one must be used which has a lower melting point than the materials making up the substrate layers. It has been found that where synthetic fibres are utilised in a substrate, then preferably the hot-melt adhesive powder is a low temperature adhesive polymer with a melting point approximately 20°–30° C. below that of the fibres to prevent damage thereto. Due regard must also be paid to optimising the adhesive compatibility of the powder with the substrate fibres. The preferred low temperature powder adhesives mentioned above will maintain their bond strength when the laminated tissue is wetted with water.

Preferably also, the chlorine release agent becomes active when dampened with water.

The chlorine release agent may, for example, comprise one or more of the following chemicals: calcium hypochlorite; chlorinated tri-sodium phosphate; N,N dichlorazo-dicarbonamidine; sodium p toluene sulphonchloramide; p toluene sulphondichloramide; sodium benzene sulphonchloramide; succinchloride; p-sulphondichloramidobenzoic acid; 1,3 dichloroo-5-5 diethyl hydantoin; trichloro-isocyanuric acid; sodium dichloroisocyanurate; sodium dichloroisocyanurate dihydrate; potassium dichloroisocyanurate; or trichloromelamine. In addition, other chlorine release agents can be used which are either solid or which may be rendered as powders or granules by adsorption on to a suitable carrier.

Additionally, a chlorine release agent may be used in combination with other compounds such as a detergent, for example sodium alklybenzene sulphonate, or sodium lauryl sulphate, or a detergent builder, for example sodium carbonate, sodium metasilicate, or sodium sulphate. Other compounds which may be used in this way include superabsorbent polymers, fragrances, perfumes, abrasives, or dyes.

If the tissue is to be used for disinfecting surfaces, then a dye may be either incorporated into at least one of the substrate layers or mixed with the particles so that it is bleached by the chlorine when released to provide a visual indication of the status of the tissue with regard to the exhaustion of its disinfecting properties.

The present invention will now be described by way of example with particular reference to the production of tissues suitable for use in the disinfection of surfaces.

A disposable tissue for use in the disinfection of a hard surface is made by mixing together sodium dichloro-isocyanurate dihyrate, otherwise known as sodium dichlor-1,3,5 triazinetrione dihydrate, in powder form with a low melting point polyester bonding powder until an even mix is obtained. This mixed powder is then uniformly scattered or otherwise applied to a first substrate layer such as a web of light-weight absorbent paper or nonwoven. It will be appreciated that the final level of chlorine donor available in the finished product will be influenced inter alia by the rate of powder application, by the proportion of adhesive powder to chlorine donor powder, and by the speed of the web receiving the powder.

For example, a chlorine disinfectant wipe within the scope of this invention may be made by applying a powder comprising 3 parts sodium dichloro-isocyanurate dihyrate mixed with 20 parts of polyethylene adhesive powder, to a 20 grams per square meter viscose nonwoven. The rate of application of powder is 12 grams per square meter with the nonwoven web moving at 30 meters/minute.

The ratio of chlorine donor to adhesive powder may vary from 1–40 to 1–1. The substrate weight may vary from 12 grams per square meter up to 80 grams per square meter but is preferably between 15 and 30 grams per square meter, whilst the rate of powder application may be varied between 2 and 50 grams per square meter, but is preferably between 4 and 35 grams per square meter. The substrate may be selected from amongst those previously mentioned. A second substrate is then overlaid on the first layer so that the powder mixture is sandwiched between the two layers and heat and pressure are applied for a short period of time. The level of heat applied should be sufficient to cause the bonding powder to melt and bond the substrate layers together but not sufficient to cause any detrimental effect to the substrate layers, or the chlorine release agent, or any other chemicals mixed therewith. It will be appreciated that the melting and subsequent resetting of the bonding powders to bind the substrate layers together also binds and retains the chlorine release agent in the tissue.

Owing to the uniform dispersion of the chlorine release agent in the bonding powder initially and the uniform scattering of the resulting mixture over first substrate layer, the chlorine releasing agent is sufficiently uniformly dispersed between the substrate layers to avoid hazards which may otherwise be anticipated in the use of chlorine compounds with fragile cellulosic material, such as paper, as a result of the oxidative potential of such materials. In addition, a quantitatively measurable amount of the chlorine release agent is bonded between the substrate layers and this amount can be varied over a wide range to enable the tissue to function as a sanitiser at one end of the range or as a heavy duty disinfecting product at the other end of the range.

It will be appreciated that this product can be made simply utilising the cheapest and most absorbent types of substrate, for example paper tissue, and embodies the properties of antimicrobial effectiveness with the convenience, simplicity, disposability and affordability required by many users of such products.

Four specific batch manufacturing processes will now be described for the production of tissue wipes with varying chlorine donor loadings.

EXAMPLE 1

This process will produce a 15 cm×10 cm wipe with a chlorine donor loading corresponding to the generation of 5000 parts per million available chlorine when dampened with 5 ml of water.

Sodium dichloro -1,3,5 triazinetrione dihydrate powder, otherwise known as sodium dichloroisocyanurate dihydrate, is coloured blue by tumble mixing it with Ultramarine blue pigment in the ratio 100 parts chlorine donor powder to 0.15 parts pigment. The resulting dyed powder is then mixed with an EVA (ethylene vinyl acetate) hot melt adhesive powder in the ratio of 1 part dyed chlorine donor powder to 2.33 parts by weight of the adhesive powder. Mixing is continued until a homogeneous mixture is obtained.

The dyed chlorine donor and adhesive powder mixture is then placed in the scattering head of a conventional laminating machine and applied to the surface of a nonwoven fabric such as previously described at a rate of 10 grams per square meter. A second layer of nonwoven fabric is then laid over the surface of the first fabric, trapping the scattered powder between the fabric layers. These layers are then laminated together at the laminating head of the machine by a combination of heat and pressure causing the adhesive powder to melt to weld the fabric layers together and trap the dyed chlorine donor powder therebetween.

After lamination, the bonded fabric layers are reeled and transferred to converting machinery which slits and cuts the fabric layers into individual 15 cm ×10 cm wipes ready for packing.

It will be appreciated that blue dye which was initially mixed with the chlorine donor powder permits the status of the wipe to be visually assessed as on release of chlorine by the donor powder when the wipe is dampened, the blue dye is gradually bleached white by the chlorine. The ratio of dye to chlorine donor powder is gauged such that once the wipe has turned completely white it can be assumed that all available chlorine has been released and that the wipe is no longer effective for disinfection purposes.

Application rate of powder mixture $=10$ g/m$^2$.

Each wipe is 10 cm×15 cm=0.015 m$^2$ giving 66.66 wipes per square meter.

Hence:

$$\frac{10}{66.66} = 0.150 \text{ g powder mixture per wipe}$$

$$\frac{0.150 \times 1}{3.33} = 0.045 \text{ g chlorine donor powder per wipe}$$

$$\frac{0.150 \times 2.33}{3.33} = 0.105 \text{ g adhesive powder per wipe}$$

$$\frac{0.045 \times 100}{0.150} = 30\% \text{ chlorine donor powder}$$

$$\frac{0.105 \times 100}{0.150} = 70\% \text{ adhesive powder}$$

EXAMPLE 2

This process will produce a 20 cm×20 cm wipe with a chlorine donor loading corresponding to the generation of 5000 parts per million available chlorine when dampened with 15 ml of water.

In this example sodium dichloro-1,3,5 triazinetrione dihydrate powder is again coloured blue as in Example 1 by tumble mixing it with Ultramarine blue pigment in the ratio 100 parts chlorine donor powder to 0.15 parts pigment. The resulting dyed powder is then mixed with an EVA (ethylene vinyl acetate) hot melt adhesive powder in the ratio of 1 part dyed chlorine donor powder to 2.074 parts by weight of the adhesive powder until an homogeneous mixture is obtained.

As in Example 1 a conventional laminating machine is used to scatter the powder mixture on to a first nonwoven fabric layer at the rate of 10.375 grams per square meter. After lamination of a second nonwoven fabric layer on to the first layer, the resulting laminate is cut into 20 $cm^2$ wipes ready for packing.

Application rate of powder mixture = 10.375 $g/m^2$.

Each wipe is 20 cm × 20 cm = 0.040 $m^2$ giving 25 wipes per square meter.

Hence:

$$\frac{10.375}{25} = 0.415 \text{ g powder mixture per wipe}$$

$$\frac{0.415 \times 1}{3.074} = 0.135 \text{ g chlorine donor powder per wipe}$$

$$\frac{0.415 \times 2.074}{3.074} = 0.280 \text{ g adhesive powder per wipe}$$

$$\frac{0.135 \times 100}{0.415} = 32.5\% \text{ chlorine donor powder}$$

$$\frac{0.280 \times 100}{0.415} = 67.5\% \text{ adhesive powder}$$

EXAMPLE 3

This process will produce a 30 cm × 30 cm wipe with a chlorine donor loading corresponding to the generation of 800 parts per million available chlorine when immersed in 1.25 liters of water.

Sodium dichloro-1,3,5 triazinetrione dihydrate powder is again coloured blue as in Example 1 and 2 by tumble mixing it with Ultramarine blue pigment in the ratio 100 parts chlorine donor powder to 0.15 parts pigment. The resulting dyed powder is then mixed with an EVA (ethylene vinyl acetate) hot melt adhesive powder in the ratio of 1 part dyed chlorine donor powder to 0.35 parts by weight of the adhesive powder until an homogeneous mixture is obtained.

This powder mixture is scattered on to a layer of nonwoven fabric in a lamination machine at the rate of 27 grams per square meter of fabric and a second layer of nonwoven fabric is bonded thereto as described in Example 1. The laminate is then cut into 30 $cm^2$ wipes.

Application rate of powder mixture = 27 $g/m^2$.

Each wipe is 30 cm × 30 cm = 0.090 $m^2$ giving 11.11 wipes per square meter.

Hence:

$$\frac{27}{11.11} = 2.43 \text{ g powder mixture per wipe}$$

$$\frac{2.43 \times 1}{1.35} = 1.80 \text{ g chlorine donor powder per wipe}$$

$$\frac{2.43 \times 0.35}{3.074} = 0.63 \text{ g adhesive powder per wipe}$$

-continued $$\frac{1.80 \times 100}{2.43} = 74.1\% \text{ chlorine donor powder}$$

$$\frac{0.63 \times 100}{2.43} = 25.9\% \text{ adhesive powder}$$

EXAMPLE 4

This process will produce a 50 cm × 50 cm wipe with a chlorine donor loading corresponding to the generation of 100 parts per million available chlorine when immersed in 10 liters of water.

As before, sodium dichloro-1,3,5 triazinetrione dihydrate powder is coloured blue as in Examples 1, 2 and 3 by tumble mixing it with Ultramarine blue pigment in the ratio 100 parts chlorine donor powder to 0.15 parts pigment. The resulting dyed powder is then mixed with an EVA (ethylene vinyl acetate) hot melt adhesive powder in the ratio of 1 part dyed chlorine donor powder to 0.972 parts by weight of the adhesive powder until an homogeneous mixture is obtained.

This powder mixture is scattered on to a layer of nonwoven fabric in a lamination machine at the rate of 14.2 grams per square meter of fabric and a second layer of nonwoven fabric is then bonded thereto as described in Example 1. The resulting laminate is cut into 25 $cm^2$ wipes.

Application rate of powder mixture = 14.2 $g/m^2$.

Each wipe is 50 cm × 50 cm = 0.25 $m^2$ giving 4 wipes per square meter. Hence:

$$\frac{14.2}{4} = 3.55 \text{ g powder mixture per wipe}$$

$$\frac{3.55 \times 1}{1.972} = 1.80 \text{ g chlorine donor powder per wipe}$$

$$\frac{3.55 \times 0.972}{1.972} = 1.75 \text{ g adhesive powder per wipe}$$

$$\frac{1.80 \times 100}{3.55} = 50.7\% \text{ chlorine donor powder}$$

$$\frac{1.75 \times 100}{3.55} = 49.3\% \text{ adhesive powder.}$$

I claim:

1. A tissue for use in a disinfecting or bleaching operation comprising first and second substrate layers bonded together and having liquid-activated solid particles retained therebetween, wherein the substrate layers are bonded together with an adhesive polymer, wherein said adhesive polymer is mixed with the solid particles so as to directly retain the solid particles, wherein said solid particles comprise a chlorine release agent.

2. A tissue as claimed in claim 1 wherein at least one of said substrate layers comprise a material selected from the group consisting of: paper, a nonwoven material, a textile material, a sponge material, and a plastic film.

3. A tissue as claimed in claim 1 wherein the adhesive polymer in powder form is mixed with the particles comprising the chlorine release agent and the resulting mixture is applied between the substrate layers in coating weights between 2 and 35 grams per square meter inclusive.

4. A tissue as claimed in claim 1, wherein the particles comprising the chlorine release agent are applied between the substrate layers in quantities to yield active solutions of between 10 and 10,000 parts per million available chlorine when the tissue is dampened.

5. A tissue as claimed in claim 1, wherein the adhesive polymer has a melting point below that of the materials comprising the first and second substrate layers.

6. A tissue as claimed in claim 1, wherein the adhesive polymer comprises a hot melt adhesive powder with a particle size between 0 and 750 microns inclusive, said adhesive powder being a polymer selected from the group consisting of copolyesters, copolyamides, and polyethylenes.

7. A tissue as claimed in claim 1, wherein the adhesive polymer comprises a hot melt adhesive powder with a particle size between 0 and 750 microns inclusive, said adhesive powder being a polymer selected from the group consisting of ethylene vinyl acetate and modified ethylene vinyl acetate.

8. A tissue as claimed in claim 1, wherein the chlorine release agent becomes active when dampened with water.

9. A tissue as claimed in claim 1, wherein the chlorine release agent comprises a chemical selected from the group consisting of calcium hypochlorite; chlorinated tri-sodium phosphate; N,N dichlorazo-dicarbonamidine; sodium p toluene sulphonchloramide; p toluene sulphondichloramide; sodium benzene sulphonchloramide; succinchloride; p-sulphondichloramidobenzoic acid; 1, 3 dichloroo-5,5 diethyl hydantoin; trichloroisocyanuric acid; sodium dichloroisocyanurate; sodium dichloroisocyanurate dihydrate; potassium dichloroisocyanurate; and trichloromelamine.

10. A tissue as claimed in claim 1, wherein a dye is either incorporated into at least one of the substrate layers or mixed with the particles comprising the chlorine release agent, so that when the tissue is dampened and chlorine released, the dye is bleached by the chlorine to provide a visual indication of the status of the tissue with regard to the exhaustion of chlorine therefrom.

* * * * *